US009984299B2

(12) United States Patent
Mori

(10) Patent No.: US 9,984,299 B2
(45) Date of Patent: May 29, 2018

(54) EYE OPENING DEGREE DETECTION SYSTEM, DOZE DETECTION SYSTEM, AUTOMATIC SHUTTER SYSTEM, EYE OPENING DEGREE DETECTION METHOD, AND EYE OPENING DEGREE DETECTION PROGRAM

(71) Applicant: RENESAS ELECTRONICS CORPORATION, Tokyo (JP)

(72) Inventor: Yuki Mori, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days. days.

(21) Appl. No.: 15/428,680

(22) Filed: Feb. 9, 2017

(65) Prior Publication Data

US 2017/0236016 A1 Aug. 17, 2017

(30) Foreign Application Priority Data

Feb. 15, 2016 (JP) .................................. 2016-025839

(51) Int. Cl.
G06K 9/00 (2006.01)
B60K 28/06 (2006.01)
(Continued)

(52) U.S. Cl.
CPC .......... G06K 9/00845 (2013.01); B60K 28/06 (2013.01); G06K 9/0061 (2013.01);
(Continued)

(58) Field of Classification Search
CPC .. B60K 28/06; H04N 5/23219; H04N 5/2353; G08B 21/06; G06K 2009/4666;
(Continued)

(56) References Cited

U.S. PATENT DOCUMENTS

2011/0050865 A1* 3/2011 Seong ................ H04N 13/0438
348/53
2012/0086712 A1* 4/2012 Jung .................. H04N 13/0438
345/419
2013/0307930 A1* 11/2013 Li ...................... H04N 13/0007
348/43

FOREIGN PATENT DOCUMENTS

CN 102685369 A * 9/2012 ............... H04N 5/21
EP 403194 A * 12/1990 ............. G03B 35/16
JP 2004-041485 A 2/2004

* cited by examiner

Primary Examiner — Gregory F Cunningham
(74) Attorney, Agent, or Firm — McDermott Will & Emery LLP

(57) ABSTRACT

An object of the present invention is to provide an eye opening degree detection system that can accurately and stably calculate an eye opening degree. The eye opening degree detection system includes imaging devices that generate images including regions of both eyes, a one eye opening degree calculation unit that calculates each one eye opening degree of the left and right eyes of a first image, an eye opening degree selection unit that selects a correctly-calculated one eye opening degree, an eye opening degree calculation unit that calculates an eye opening degree on the basis of the one eye opening degree and an eye opening degree determination unit that compares the eye opening degree calculated on the basis of the first image with an eye opening degree calculated on the basis of a second image prior to the first image to determine the propriety of the eye opening degree.

7 Claims, 11 Drawing Sheets

ONE EYE OPENING DEGREE $\alpha = \dfrac{K}{K_{max}}$

(51) Int. Cl.
*G06K 9/46* (2006.01)
*G06K 9/62* (2006.01)
*G08B 21/06* (2006.01)
*H04N 5/232* (2006.01)
*H04N 5/235* (2006.01)

(52) U.S. Cl.
CPC ....... *G06K 9/00617* (2013.01); *G06K 9/4642* (2013.01); *G06K 9/6296* (2013.01); *G08B 21/06* (2013.01); *H04N 5/2353* (2013.01); *H04N 5/23219* (2013.01); *G06K 2009/4666* (2013.01)

(58) Field of Classification Search
CPC ............. G06K 9/4642; G06K 9/00845; G06K 9/00617; G06K 9/0061; G06K 9/6296
USPC ........................................................ 382/104
See application file for complete search history.

FIG. 2
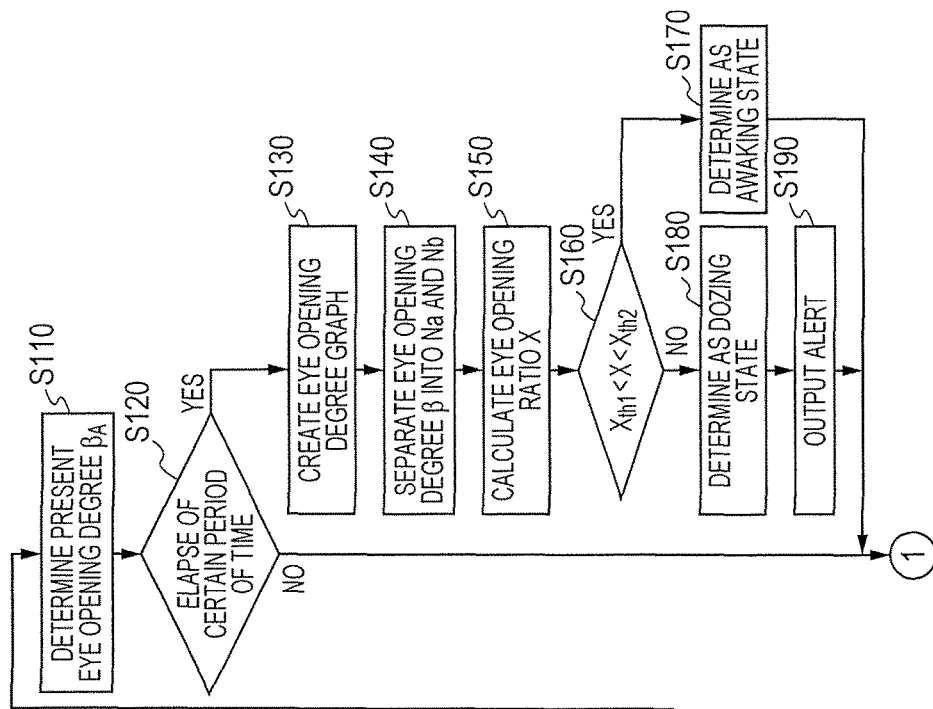
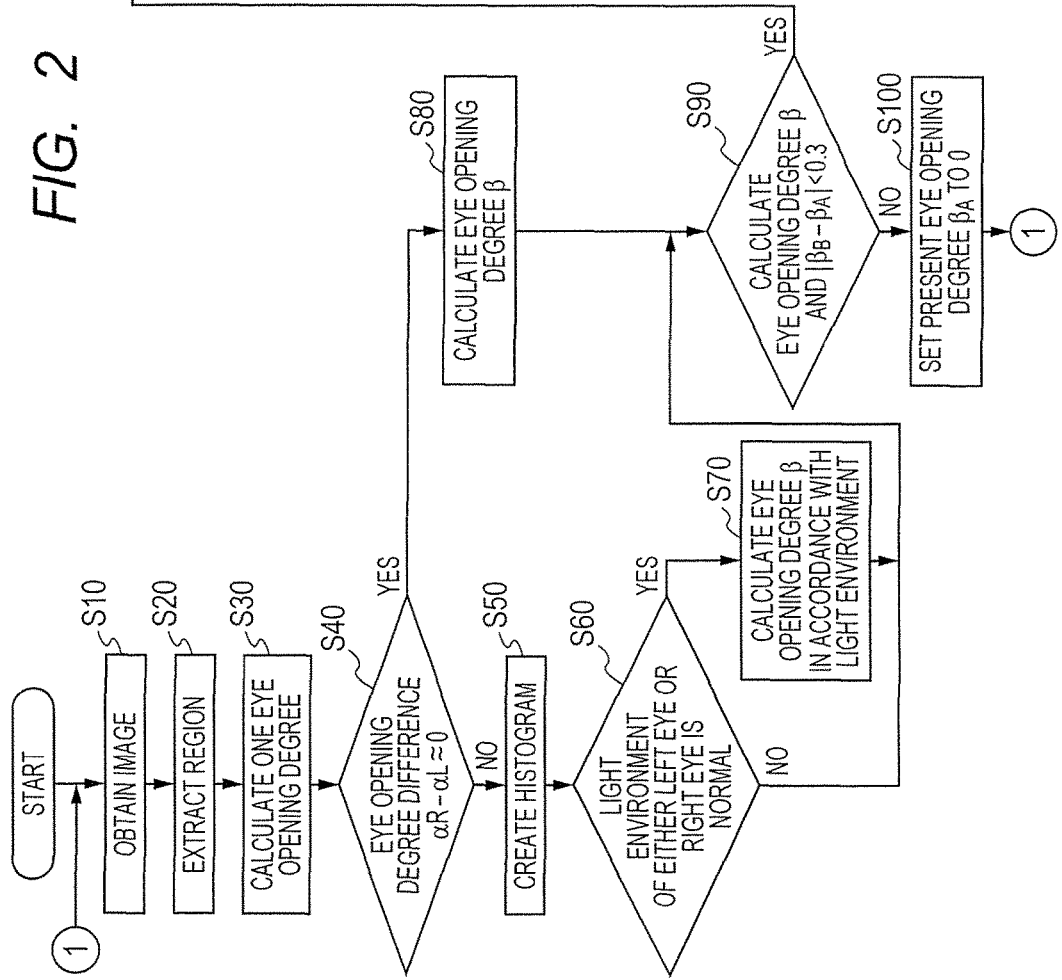

ONE EYE OPENING DEGREE $\alpha = \dfrac{K}{Kmax}$

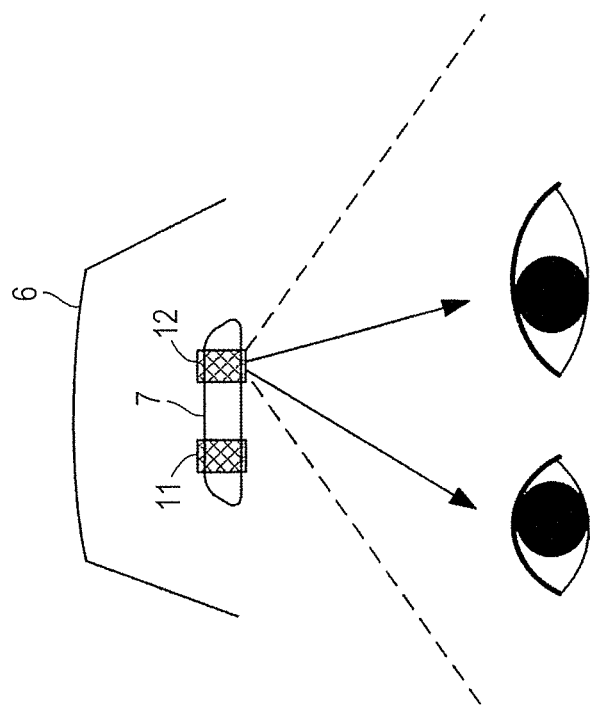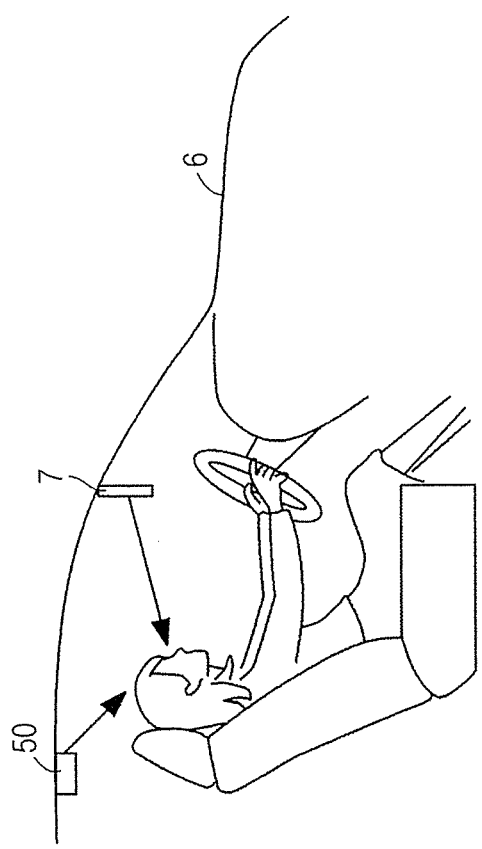
FIG. 8

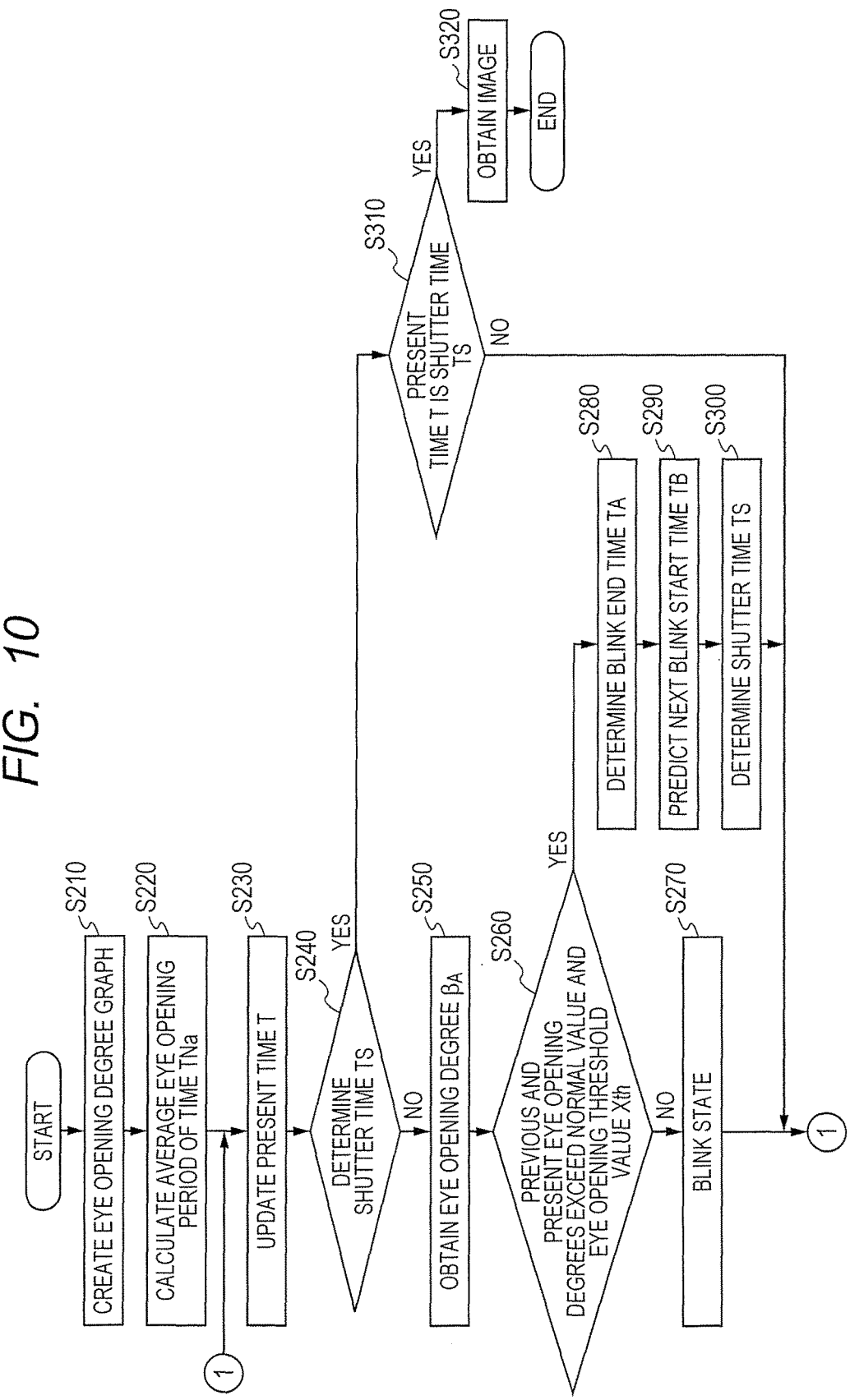

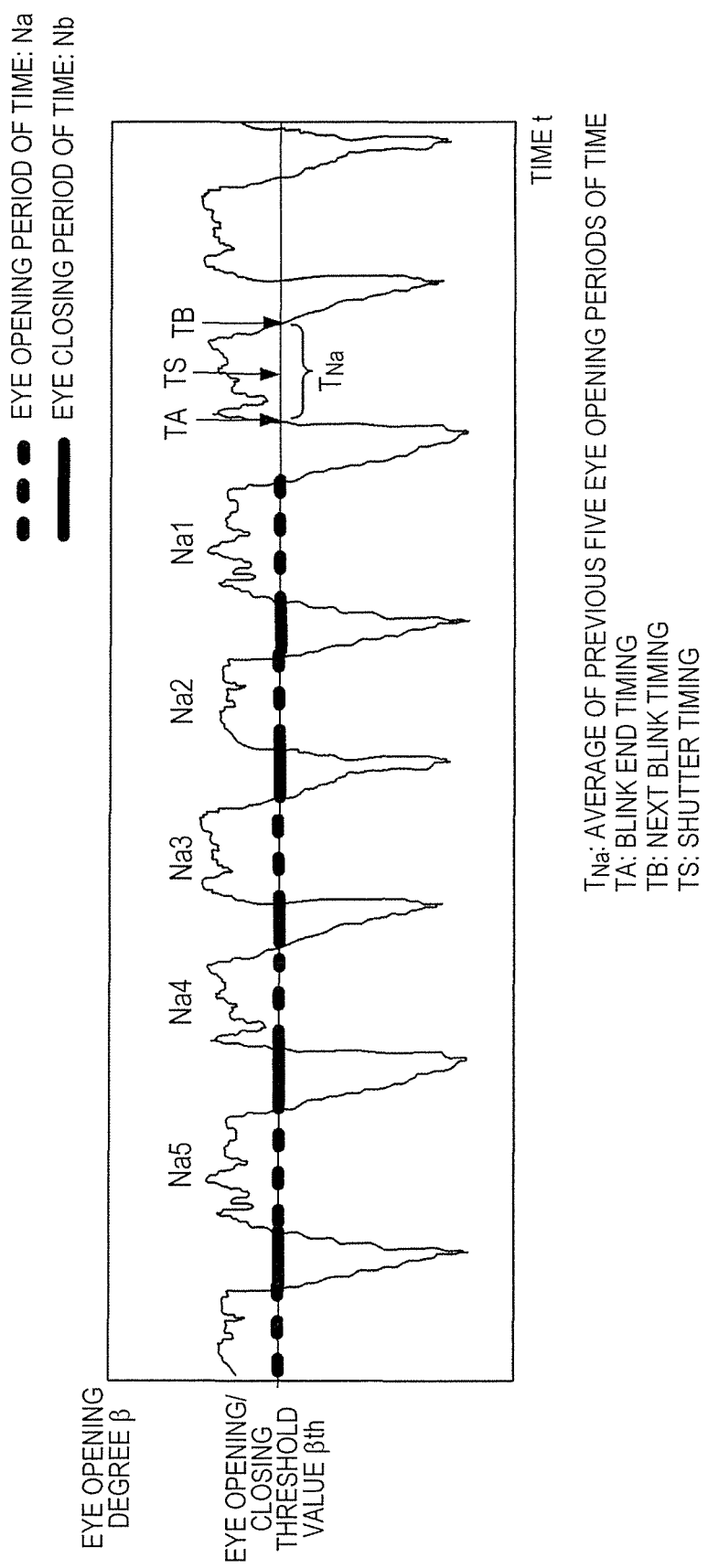

EYE OPENING DEGREE DETECTION
SYSTEM, DOZE DETECTION SYSTEM,
AUTOMATIC SHUTTER SYSTEM, EYE
OPENING DEGREE DETECTION METHOD,
AND EYE OPENING DEGREE DETECTION
PROGRAM

CROSS-REFERENCE TO RELATED
APPLICATIONS

The disclosure of Japanese Patent Application No. 2016-025839 filed on Feb. 15, 2016 including the specification, drawings and abstract is incorporated herein by reference in its entirety.

BACKGROUND

The present invention relates to an eye opening degree detection system, a doze detection system, an automatic shutter system, an eye opening degree detection method, and an eye opening degree detection program.

An eye opening degree detection system for detecting dozing of a driver of a vehicle has been developed. For example, Japanese Unexamined Patent Application Publication No. 2004-041485 describes an eye opening/closing monitoring device that sets a threshold value for determining eye closing irrespective of individuals or environments.

SUMMARY

In the eye opening degree detection system according to the related art, when detecting an eye opening degree on the basis of an image imaged by a camera, blinks are determined by changing a threshold value for determining eye opening and closing in a bad light environment. However, there is a possibility that the eye opening degree detected using the image imaged in a bad light environment is inaccurate even if the threshold value for determining eye opening and closing is changed, and thus the determination of dozing becomes unstable.

Accordingly, an eye opening degree detection system, a doze detection system, an automatic shutter system, an eye opening degree detection method, and an eye opening degree detection program that can accurately and stably calculate the eye opening degree have been desired.

The other objects and novel features will become apparent from the description of the specification and the accompanying drawings.

According to an embodiment, provided is an eye opening degree detection system that includes: a plurality of imaging devices that generates images including, at least, regions of both eyes of a target person while shifting time; a one eye opening degree calculation unit that calculates each one eye opening degree of the left and right eyes of a first image; an eye opening degree selection unit that creates a pixel value histogram of each region of the left and right eyes when the left and right one eye opening degrees do not substantially match each other, and selects a correctly-calculated one eye opening degree on the basis of the pixel value histogram; an eye opening degree calculation unit that calculates an eye opening degree on the basis of the left and right one eye opening degrees when the left and right one eye opening degrees substantially match each other, and calculates an eye opening degree on the basis of the one eye opening degree selected by the eye opening degree selection unit when the left and right one eye opening degrees do not substantially match each other; and an eye opening degree detection device having an eye opening degree determination unit that compares the eye opening degree calculated on the basis of the first image with an eye opening degree calculated on the basis of a second image prior to the first image to determine the propriety of the eye opening degree calculated on the basis of the first image.

It should be noted that ones expressed by replacing the system of the above-described embodiment with a device, a method, or another system (for example, a doze detection system or an automatic shutter system), a program that allows a computer to execute a process of the system or a part of the system, and an imaging device and an automobile having the system are applicable as modes of the present invention.

According to the above-described embodiment, it is possible to provide an eye opening degree detection system, a doze detection system, an automatic shutter system, an eye opening degree detection method, and an eye opening degree detection program that accurately and stably calculate an eye opening degree.

BRIEF DESCRIPTION OF THE DRAWINGS

FIG. 2 is a flowchart for showing a processing procedure of a doze detection method according to the first embodiment;

FIG. 8 is a diagram for showing a state in which the doze detection system 1 according to the first embodiment is attached to the inside of an automobile 6;

FIG. 10 is a flowchart for showing a processing procedure of an automatic shutter method according to the second embodiment; and FIG. 11 shows an example of an eye opening degree transition graph according to the second embodiment.

DETAILED DESCRIPTION

Figure 1:
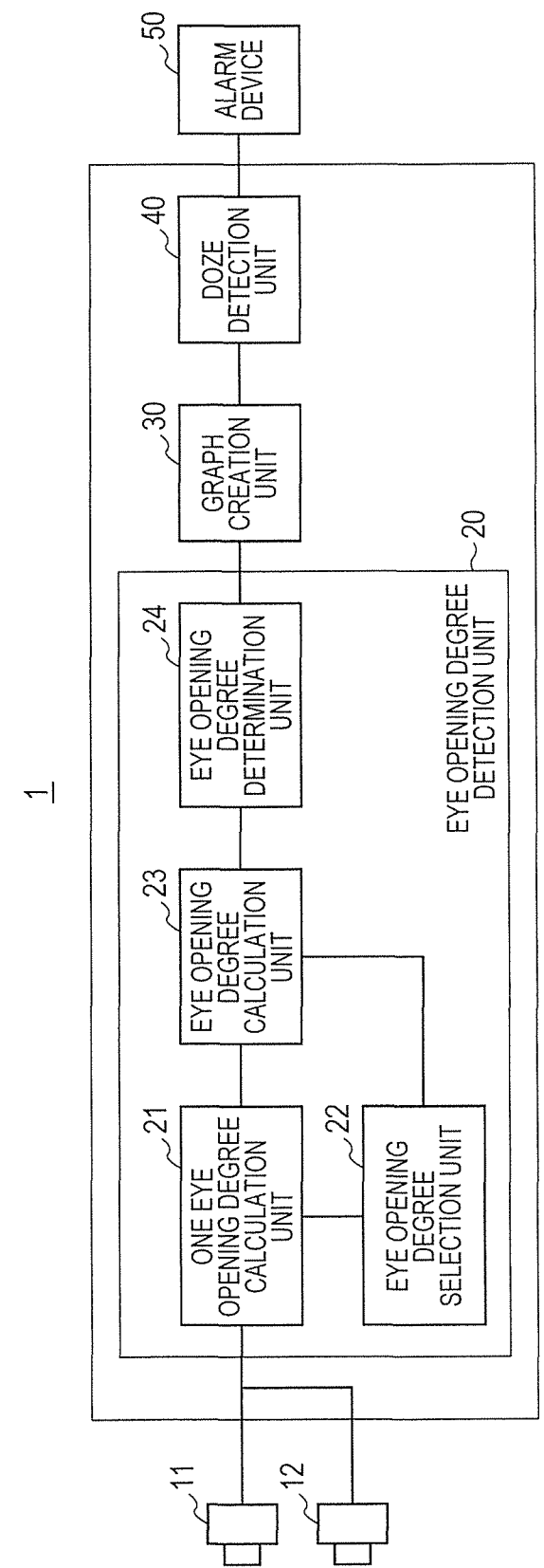
FIG. 1 is a diagram for showing an outline configuration of a doze detection system 1 according to a first embodiment.

In order to clarify the explanation, the following descriptions and drawings are appropriately omitted and simplified.

Further, the same reference numerals are given to the same constitutional elements in the respective drawings, and duplicated explanations are omitted as needed.

First Embodiment

A doze detection system according to a first embodiment is mounted in a vehicle such as an automobile, a target driver is imaged by a plurality of cameras while shifting time, and dozing of the driver is detected on the basis of the eye opening degrees of the eyes of the driver calculated using the images.

First, a configuration of a doze detection system 1 according to the first embodiment will be described.

FIG. 1 is a diagram for showing an outline configuration of the doze detection system 1 according to the first embodiment.

The doze detection system 1 includes two cameras 11 and 12, an eye opening degree detection unit 20, a graph creation unit 30, a doze detection unit 40, an alarm device 50, and the like.

The cameras 11 and 12 are arranged diagonally forward on the left and right sides of a driver to alternately image the driver, and output the images to the eye opening degree detection unit 20.

The eye opening degree detection unit 20 detects an eye opening degree at each timing when each of the images was imaged on the basis of the images. Therefore, the eye opening degree detection unit 20 includes a one eye opening degree calculation unit 21, an eye opening degree selection unit 22, an eye opening degree calculation unit 23, an eye opening degree determination unit 24, and the like.

The one eye opening degree calculation unit 21 extracts each region of the left and right eyes from each image, and calculates a feature amount to calculate each eye opening degree (hereinafter, referred to as a "one eye opening degree") of the left and right eyes. Further, the one eye opening degree calculation unit 21 determines whether or not the calculated left and right one eye opening degrees substantially match each other, and outputs the result to the eye opening degree selection unit 22 and the eye opening degree calculation unit 23.

When the left and right one eye opening degrees calculated by the one eye opening degree calculation unit 21 do not substantially match each other, the eye opening degree selection unit 22 creates a pixel value histogram of each region of the left and right eyes, and selects a correctly-calculated one eye opening degree on the basis of the pixel value histogram to output the result to the eye opening degree calculation unit 23.

When the left and right one eye opening degrees calculated by the one eye opening degree calculation unit 21 substantially match each other, the eye opening degree calculation unit 23 calculates the eye opening degree on the basis of the left and right one eye opening degrees. Further, when the left and right one eye opening degrees do not substantially match each other, the eye opening degree is calculated on the basis of the one eye opening degree selected by the eye opening degree selection unit 22. In addition, the calculated eye opening degree is output to the eye opening degree determination unit 24.

The eye opening degree determination unit 24 compares the eye opening degree of the image imaged at certain timing with the eye opening degree of the image imaged at preceding timing. When it is determined that the eye opening degree at the certain timing is correct, the eye opening degree at the certain timing is output to the graph creation unit 30.

The graph creation unit 30 creates an eye opening degree transition graph showing a relation between the imaging timing and the eye opening degree of each image, and outputs the graph to the doze detection unit 40.

The doze detection unit 40 determines a period of time (hereinafter, referred to as an "eye opening period of time") during which the eyes of the driver are opened and a period of time (hereinafter, referred to as an "eye closing period of time") during which the eyes of the driver are closed on the basis of the eye opening degree transition graph, and detects dosing of the driver on the basis of a ratio of the eye opening period of time to the eye closing period of time in a predetermined period of time. Further, when detecting dosing of the driver, the doze detection unit 40 outputs the result to the alarm device 50 such as a speaker, and the alarm device 50 generates an alarm for the driver.

With such a configuration, the doze detection system 1 can accurately and stably detect the eye opening degree, and can properly detect dosing of the driver on the basis of the detected eye opening degree.

It should be noted that each constitutional element realized by the doze detection system 1 can be realized by executing a program under the control of, for example, a computing device (not shown) included in the doze detection system 1 (excluding the cameras 11 and 12 and the alarm device 50) that is a computer.

More specifically, the doze detection system 1 realizes each constitutional element in such a manner that a program stored in a storing unit (not shown) is loaded into a main storing device (not shown) and is executed under the control of the computing device. Further, it is not necessary to realize each constitutional element using a software program, but each constitutional element may be realized using any combination of hardware, firmware, and software.

The above-described program is stored using non-transitory computer readable media of various types, and can be supplied to the doze detection system 1. The non-transitory computer readable media include tangible storage media of various types.

Examples of the non-transitory computer readable media include a magnetic recording medium (for example, a flexible disk, a magnetic tape, or a hard-disk drive), a magnetooptic recording medium (for example, a magnetooptic disk), a CD-ROM (Read Only Memory), a CD-R, a CD-R/W, and a semiconductor memory (for example, a mask ROM, a PROM (Programmable ROM), an EPROM (Erasable PROM), a flash ROM, or a RAM (random access memory)).

Further, the program may be supplied to the doze detection system 1 by transitory computer readable media of various types. Examples of the transitory computer readable media include an electric signal, an optical signal, and an electromagnetic wave. The transitory computer readable media can supply the program to the doze detection system 1 through a wired communication channel such as an electric wire or an optical fiber, or a wireless communication channel.

Next, an operation of the doze detection system 1 according to the first embodiment, namely, a doze detection method will be concretely described.

FIG. 2 is a flowchart for showing a processing procedure of the doze detection method according to the first embodiment.

When an operation of the doze detection system 1 is started, the cameras 11 and 12 alternately image the driver (Step S10). In this case, each shutter speed of the cameras 11 and 12 is set to, for example, about 30 ms (30 fps).

Next, the one eye opening degree calculation unit 21 extracts each region of the left and right eyes from one of the images (Step S20). A method of extracting the regions of the left and right eyes may be any one of well-known methods. However, for example, a method described in Japanese Unexamined Patent Application Publication No. 2008-191785 is used.

Next, a one eye opening degree α is calculated in each region of the left and right eyes extracted by the one eye opening degree calculation unit 21 (Step S30).

Figure 3A:
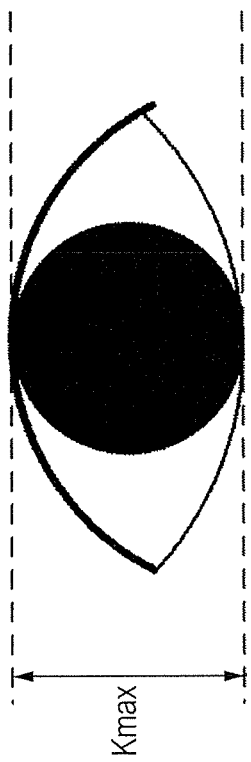
FIGS. 3A and 3B are diagrams each explaining a calculation method of a one eye opening degree $\alpha$ according to the first embodiment.
Figure 3B:
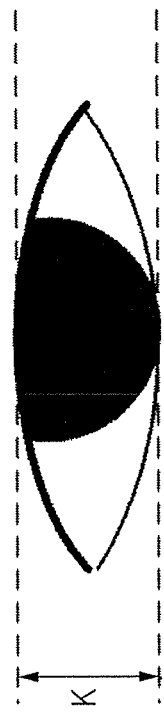

FIGS. 3A and 3B are diagrams each explaining a calculation method of the one eye opening degree α according to the first embodiment. FIG. 3A shows a shape of an eye that is normally opened, and FIG. 3B shows a shape of an eye in the middle of blinking. An eye opening width K is defined by the number of pixels (or a dimension) between the uppermost part and the lowermost part of upper and lower eyelids.

The one eye opening degree calculation unit 21 preliminarily calculates the eye opening width Kmax of the eye that is no/many opened, and calculates the eye opening width K of the eye extracted in Step 20 to calculate the one eye opening degree α(=K/Kmax). In this case, the one eye opening degrees of the right and left eyes are represented by αR and αL, respectively.

In addition, the one eye opening degree calculation unit 21 determines whether or not the left and right one eye opening degrees αL and αR substantially match each other (Step S40). In this case, the determination can be made on the basis of whether or not, for example, the difference between the left and right one eye opening degrees αL and αR falls within a predetermined ratio of the one eye opening degree α that is larger than another.

Next, when it is determined that the left and right one eye opening degrees αL and αR do not substantially match each other (No in Step S40), the one eye opening degree calculation unit 21 determines that the eye opening degree is unstable due to an abnormal light environment in any one of the regions of the left and right eyes or an abnormal light environment of any one of the cameras 11 and 12 deriving from sunlight or headlights at night. Thus, the eye opening degree selection unit 22 creates a pixel value histogram of the regions of the left and right eyes, for example, a brightness value histogram to determine the state of the light environment (Step S50).

Figure 4:
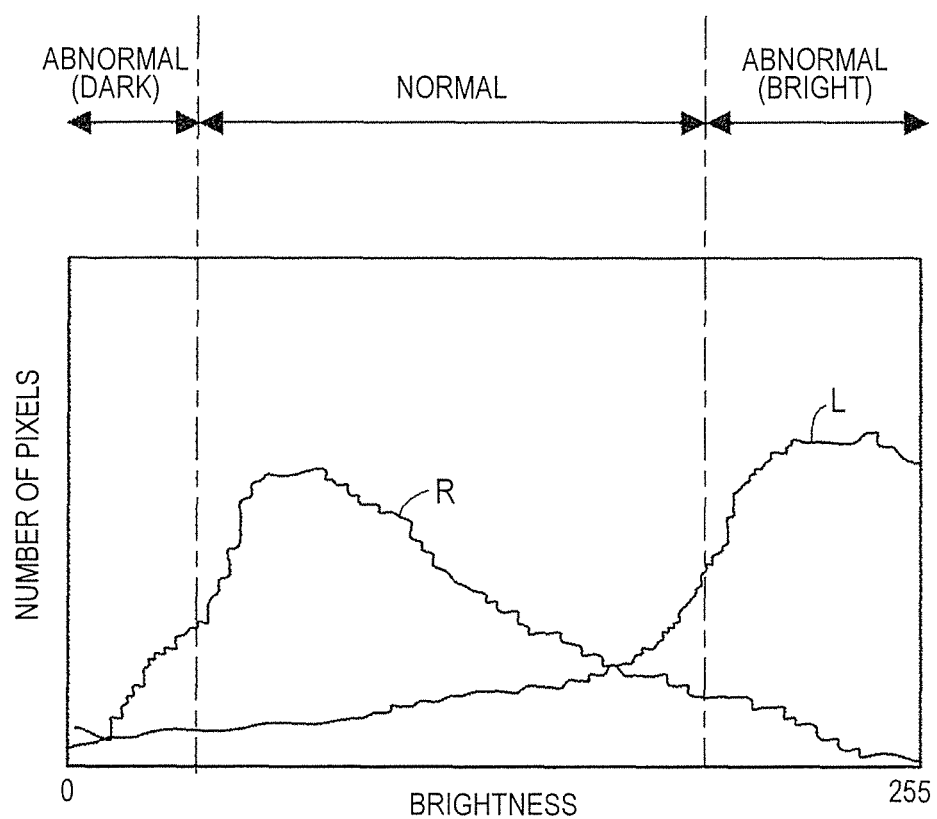
FIG. 4 shows an example of a brightness value histogram according to the first embodiment.

FIG. 4 shows an example of the brightness value histogram according to the first embodiment.

The histogram R of the region of the right eye mostly falls within a normal value region, and the histogram L of the region of the left eye mostly falls within an abnormal (bright) region. Namely, it can be assumed that intense light such as sunlight enters from the left direction.

Accordingly, the eye opening degree selection unit 22 determines that the one eye opening degree αL is not correctly calculated due to the abnormal light environment of the left eye, and the one eye opening degree αR is correctly calculated due to the normal light environment of the right eye (Step S60).

In addition, when the eye opening degree selection unit 22 determines that the light environment of either the left eye or the right eye is normal, namely, the light environment of the right eye is normal in this case (Yes in Step S60), the eye opening degree calculation unit 23 calculates an eye opening degree βA on the basis of the following equation (1) (eye opening degree calculation equation) (Step S70).

$$\beta A = AR \times \alpha R + AL \times \alpha L \qquad \text{Equation (1)}$$

Specifically, when the light environment of the right eye is normal and the light environment of the left eye is abnormal, the eye opening degree calculation unit 23 sets an eye opening degree state coefficient AR of the right eye in the eye opening degree calculation equation to 1, and sets an eye opening degree state coefficient AL of the left eye that is an unstable element to 0 as shown in the following equation (2).

$$\beta A = 1 \times \alpha R + 0 \times \alpha L = \alpha R \qquad \text{Equation (2)}$$

Namely, the one eye opening degree αR is set to the eye opening degree βA to stabilize the eye opening degree βA.

On the other hand, when it is determined that the left and right one eye opening degrees αL and αR substantially match each other (Yes in Step S40), the one eye opening degree calculation unit 21 determines that the light environments of both eyes are normal and the eye opening degrees are stable. Thus, the eye opening degree calculation unit 23 sets each of the left and right eye opening degree state coefficients AL and AR in the eye opening degree calculation equation to 0.5 to calculate the eye opening degree βA as shown in the following equation (3).

$$\beta A = 0.5 \times \alpha R + 0.5 \times \alpha L \qquad \text{Equation (3)}$$

In addition, when the light environments of both eyes are not normal (No in Step S60), or when the eye opening degree βA is calculated (Step S70 and Step S80), it is determined whether or not the eye opening degree calculation unit 23 can calculate the eye opening degree βA and the absolute value |βA-βB| of the difference between the eye opening degree βA calculated this time and an eye opening degree βB calculated immediately before is 0.3 or smaller (Step S90).

In the doze detection method according to the first embodiment, the cameras 11 and 12 alternately image a plurality of images, and calculates the eye opening degree β at shorter time intervals as described above. On the assumption that the eye opening degree calculated this time is represented by βA and the eye opening degree calculated from the last image from which the present eye opening degree βA was calculated is represented by βB, the abnormality of characteristics of the cameras can be detected by comparing the eye opening degrees βA and βB with each other because of the reason described below.

Figure 5:
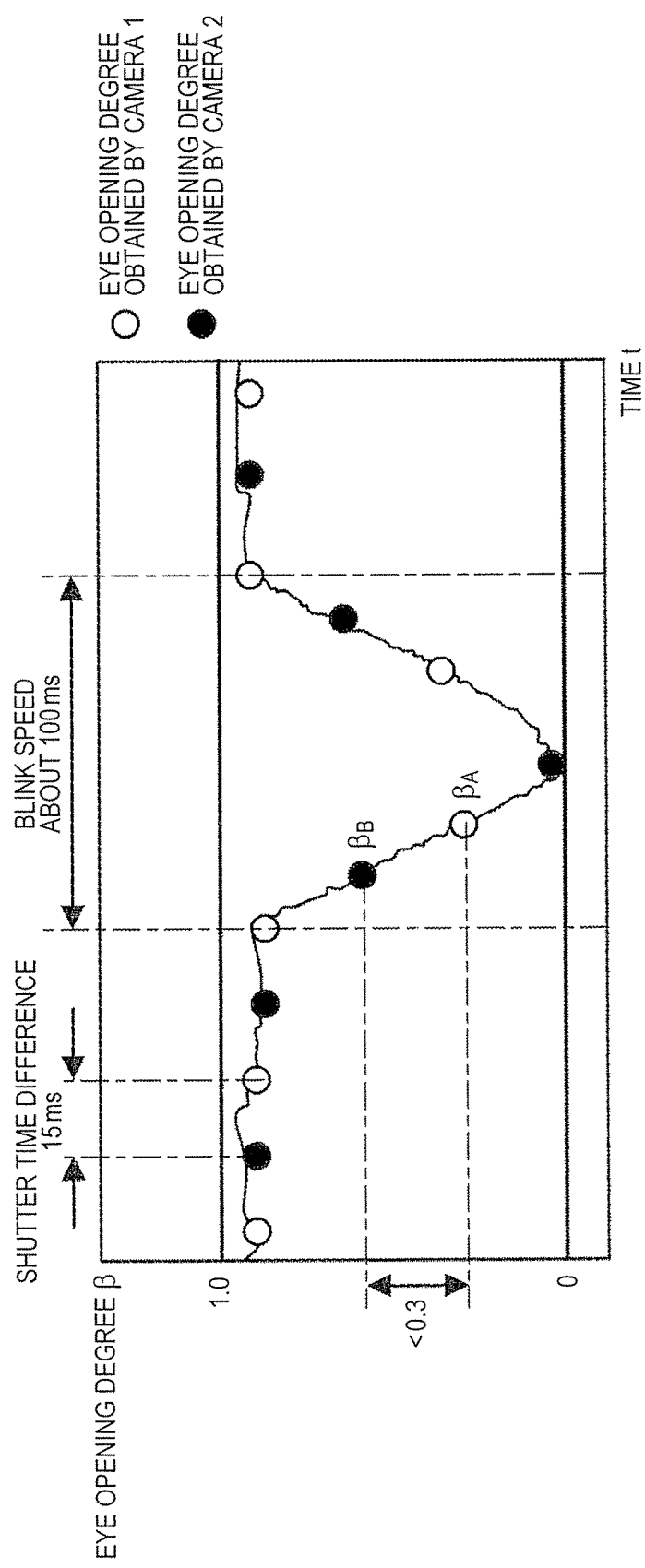
FIG. 5 is a diagram for explaining a determination method of characteristics of cameras according to the first embodiment.

FIG. 5 is a diagram for explaining a determination method of characteristics of the cameras according to the first embodiment. The horizontal axis of the graph in the drawing represents time t, and the vertical axis represents the eye opening degree β.

The blink speed of a human being is generally about 100 to 150 ms. If the blink speed is assumed as 100 ms, a period of time required from the eyelid opened state to the eyelid closed state is about 50 ms, and the eye opening degree β at the time is changed by about 1.0. In addition, the eye opening degree β changed in about 15 ms that is a shutter time difference between the cameras 11 and 12 each having a shutter speed of about 30 ms (30 fps) is about 0.3 (=1.0×15/50) or smaller even in the case of a person whose blink speed is fast. Namely, if the absolute value |βA-βB| of the difference between the present eye opening degree βA and the last eye opening degree βB is 0.3 or smaller, the characteristics of the cameras and the light environment of the present image are normal. If the absolute value |βA-βB| of the difference is larger than 0.3, the characteristics of the cameras and the light environment of the present image can be determined as abnormal.

When it is determined that the eye opening degree βA is not calculated or the absolute value |βA-βB| of the difference is not 0.3 or smaller (No in Step S90), the eye opening degree calculation unit 23 determines that the eye opening degree βA is abnormal, and sets the present eye opening degree βA to 0 (Step S100). Then, the flow returns to Step S10. Further, when it is determined that the eye opening degree βA is calculated and the absolute value |βA-βB| of the difference is 0.3 or smaller (Yes in Step S90), the eye opening degree calculation unit 23 determines that the eye opening degree βA is normal, and sets the present eye opening degree βA to the value thereof (Step S110). Then, the eye opening degree βA is stored.

Next, the graph creation unit 30 determines whether or not a certain period of time required to create the graph has elapsed (Step S120). When the graph creation unit 30 determines that the certain period of time has not elapsed (No in Step S120), the flow returns to Step S10. When the graph creation unit 30 determines that the certain period of time has elapsed (Yes in Step S120), the eye opening degree transition graph is created (Step S130).

Figure 6:
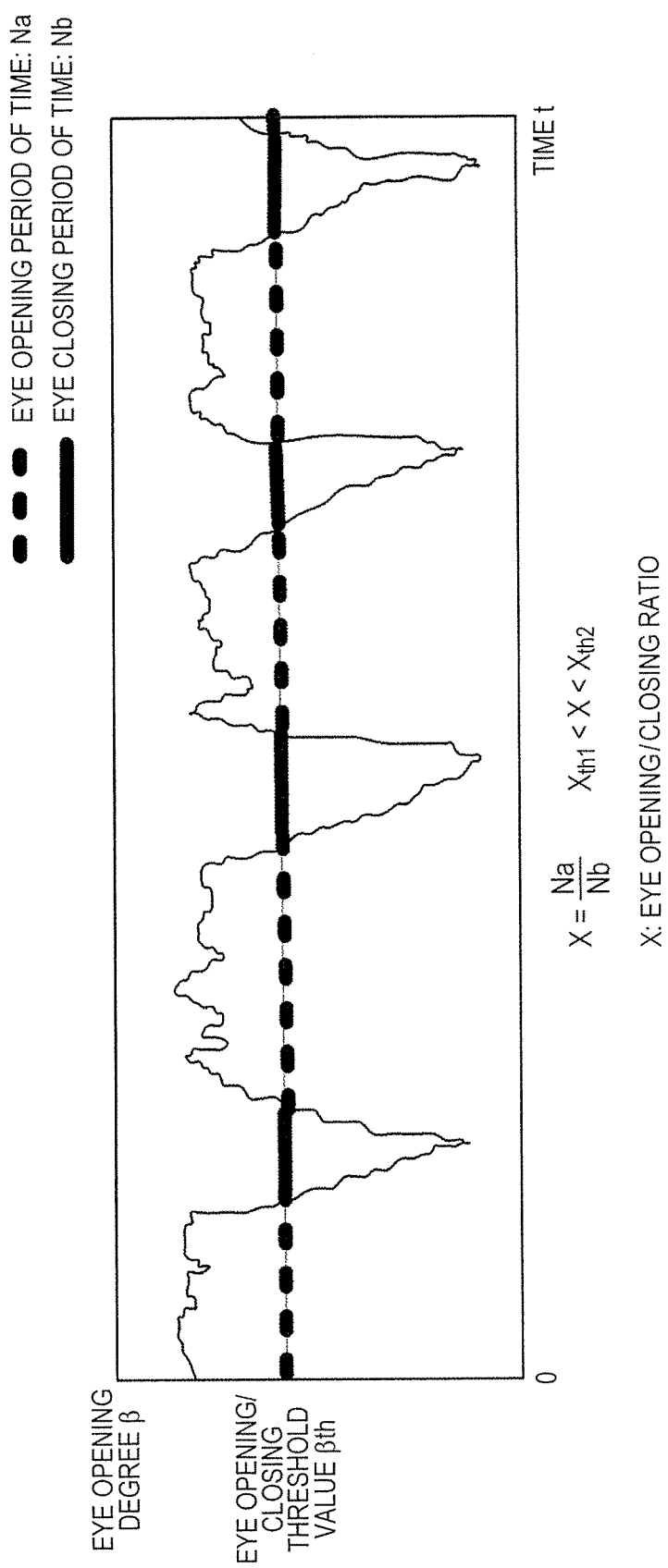
FIG. 6 shows an example of an eye opening degree transition graph according to the first embodiment.

FIG. 6 shows an example of the eye opening degree transition graph according to the first embodiment. The horizontal axis of the graph represents time t, and the vertical axis represents the eye opening degree β.

Next, the doze detection unit 40 separates the eye opening degree transition graph into eye opening periods of time Na and eye closing periods of time Nb using a predetermined eye opening/closing threshold value βth (Step S140). In FIG. 5, the eye opening periods of time Na are represented by dotted lines, and the eye closing periods of time Nb are represented by solid lines.

Next, the doze detection unit 40 calculates an eye opening ratio X (=Na/Nb) that is a ratio of the eye opening period of time Na to the eye closing period of time Nb in a predetermined period of time (Step S150).

Next, the doze detection unit 40 also determines whether or not the eyes are excessively opened (X≈∞) and the eyes are excessively closed (X≈0) on the basis of whether or not the eye opening ratio X falls within a predetermined range (Xth1<X<Xth2) (Step S160). When the doze detection unit 40 determines that the eye opening ratio X falls within the predetermined range (Yes in Step S160), it is determined that the driver is awaking (Step S170), and the flow returns to Step S10.

Further, when the doze detection unit 40 determines that the eye opening ratio X does not fall within the predetermined range (No in Step S160), it is determined that the driver is dozing (Step S180), and an alarm is output from the alarm device 50 (Step S190). Then, the flow returns to Step S10.

As described above, in the doze detection system 1 or the doze detection method according to the first embodiment, a target person is imaged using two cameras 11 and 12, and the eye opening degree β can be stabilized against the light environment by using only the eye opening degree β in a normal light environment. Further, the cameras 11 and 12 can detect the eye opening degrees β in a time series manner by imaging a target person while shifting the imaging time. A change between the eye opening degree βB calculated last and the eye opening degree βA calculated this time is comprehensively determined together with environmental changes, so that the eye opening degree β can be accurately and stably detected.

It should be noted that dozing may be detected using three or more cameras in the doze detection system or the doze detection method according to the first embodiment.

For example, a doze detection system that images a target person while shifting time with three cameras each having a shutter speed of about 30 ms (30 fps) can be configured only by adding one camera to the doze detection system 1 shown in FIG. 1. In addition, it is only necessary to change the doze detection method to one that uses three cameras in the procedures shown in FIG. 2.

Namely, if three cameras are used, the shutter time difference among those is about 10 ms, and the eye opening degree β changed during the period of time is about 0.2 (=1.0×10/50) or smaller even in the case of a person whose blink speed is fast. Accordingly, if the absolute value |βA-βB| of the difference between the present eye opening degree βA and the last eye opening degree βB is 0.2 or smaller, the characteristics of the cameras and the light environment of the present image may be determined as normal. If the absolute value |βA-βB| of the difference is larger than 0.2, the characteristics of the cameras and the light environment of the present image may be determined as abnormal.

Further, in the case where the last eye opening degree βB is 0, if the absolute value |βA-βC| of the difference between the present eye opening degree βA and an eye opening degree βC before last is 0.4 or smaller, the characteristics of the cameras and the light environment of the present image may be determined as normal. If the absolute value |βA-βC| of the difference is larger than 0.4, the characteristics of the cameras and the light environment of the present image may be determined as abnormal.

Even in the case where one of three or more cameras has a problem, the eye opening degree β can be stably calculated by the remaining cameras. Further, the eye opening degree β of one camera having a problem can be interpolated using the eye opening degrees β of the remaining cameras.

Figures 7A, 7B, 7C:
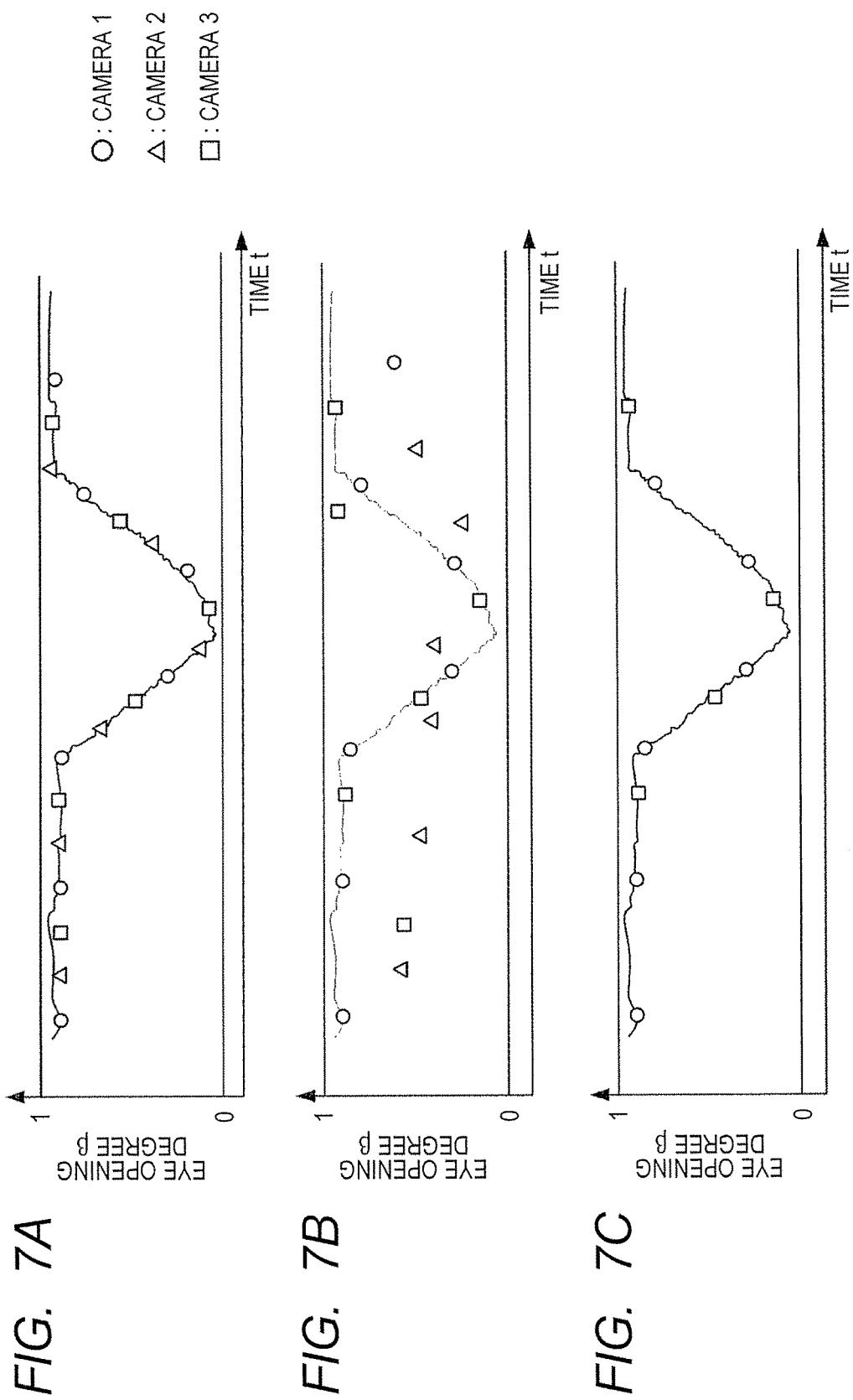
FIGS. 7A, 7B and 7C show other examples of the eye opening degree transition graph according to the first embodiment.

FIGS. 7A, 7B and 7C show other examples of the eye opening degree transition graph according to the first embodiment. FIGS. 7A, 7B and 7C show transition graphs in which the eye opening degrees β were calculated using three cameras.

FIG. 7A shows an example of the eye opening degree transition graph in which all the eye opening degrees β calculated using three cameras were normal.

On the contrary, FIG. 7B shows an example of the eye opening degree transition graph in which some of the calculated eye opening degrees β were abnormal. The abnormal cases of the eye opening degrees β include a case in which the one eye opening degrees αR and αL do not substantially match each other (No in Step S40), a case in which the light environments of both eyes are not normal (No in Step S60), and a case in which the absolute value |βA-βB| of the difference is not 0.2 or smaller (No in Step S90). In the processing procedure shown in FIG. 2, when the eye opening degree βA is abnormal as described above, the eye opening degree βA is set to 0. Thus, the graph shown in FIG. 7B is not actually created.

FIG. 7C shows an example of the eye opening degree transition graph in which the eye opening degree βA is set to 0 in the case as shown in FIG. 7B. Even in such a case, the eye opening degree transition graph can be properly created by the doze detection system according to the first embodiment.

FIG. 8 is a diagram for showing a state in which the doze detection system 1 according to the first embodiment is attached to the inside of an automobile 6. The cameras 11 and 12 are attached to a rearview mirror 7, and the alarm device (speaker) 50 is attached to the ceiling of the automobile 6. The distance between the cameras 11 and 12 and the driver is, for example, 60 cm.

The cameras 11 and 12 may be wide-angle cameras (cameras having wide viewing angles). In this case, since the horizontal widths of the left and right eyes are changed, the one eye opening degree calculation unit 21 can correct horizontal width extension (distortion) when each region of the left and right eyes is extracted from the image (Step S20).

Further, in the doze detection system 1 or the doze detection method according to the first embodiment, dosing may be detected using the inclination when blinking in the eye opening degree transition graph, namely, using the eye opening/closing speed, instead of detecting dosing using the eye opening ratio X in a predetermined period of time. The dosing of the driver can be easily detected by using the fact that the value of the eye opening/closing speed when the driver is sleepy is smaller than that when the driver is awaking.

As described above, the eye opening degree detection system according to the first embodiment includes: the imaging devices 11 and 12 that generate images including, at least, regions of both eyes of a target person while shifting time; the one eye opening degree calculation unit 21 that calculates each of the one eye opening degrees $\alpha L$ and $\alpha R$ of the left and right eyes of a first image; the eye opening degree selection unit 22 that creates the pixel value histogram of each region of the left and right eyes when the left and right one eye opening degrees $\alpha L$ and $\alpha R$ do not substantially match each other, and selects the correctly-calculated one eye opening degree $\alpha$ on the basis of the pixel value histogram; the eye opening degree calculation unit 23 that calculates the eye opening degree $\beta$ on the basis of the left and right one eye opening degrees $\alpha L$ and $\alpha R$ when the left and right one eye opening degrees $\alpha L$ and $\alpha R$ substantially match each other, and calculates the eye opening degree $\beta$ on the basis of the one eye opening degree $\alpha$ selected by the eye opening degree selection unit when the left and right one eye opening degrees $\alpha L$ and $\alpha R$ do not substantially match each other; and the eye opening degree detection device 20 having the eye opening degree determination unit 24 that compares the eye opening degree $\beta A$ calculated on the basis of the first image with the eye opening degree $\beta B$ calculated on the basis of a second image prior to the first image to determine the propriety of the eye opening degree $\beta A$ calculated on the basis of the first image.

Further, in the eye opening degree detection system according to the first embodiment, the eye opening degree determination unit 24 preferably determines that the eye opening degree $\beta A$ calculated on the basis of the first image is valid when a difference between the eye opening degree $\beta A$ calculated on the basis of the first image and the eye opening degree $\beta B$ calculated on the basis of the second image is equal to or smaller than a threshold value (for example, 0.3) calculated on the basis of an imaging timing difference between the first image and the second image.

Further, the doze detection system 1 according to the first embodiment includes: the eye opening degree detection system; the graph creation unit 30 that creates the eye opening degree transition graph on the basis of the eye opening degree $\beta A$ determined by the eye opening degree determination unit 24; and the doze detection unit 40 that determines the eye opening period of time Na and the eye closing period of time Nb on the basis of the eye opening degree transition graph, and detects dozing of the target person on the basis of the ratio X of the eye opening period of time Na to the eye closing period of time Nb in a predetermined period of time.

Further, when the ratio X is out of a range between the predetermined lower limit threshold value Xth1 excluding 0 and the predetermined upper limit threshold value Xth2 excluding infinity, the doze detection system 1 according to the first embodiment preferably detects dozing of the target person.

Further, the eye opening degree detection method according to the first embodiment includes: Step S10 of generating images including, at least, regions of both eyes of a target person while shifting time by the imaging devices 11 and 12; Steps S20 to S30 of calculating each of the one eye opening degrees $\alpha L$ and $\alpha R$ of the left and right eyes of a first image; Steps S40 to S70 of creating the pixel value histogram of each region of the left and right eyes when the left and right one eye opening degrees $\alpha L$ and $\alpha R$ do not substantially match each other, and selecting the correctly-calculated one eye opening degree $\alpha$ on the basis of the pixel value histogram; Steps S70 and S80 of calculating the eye opening degree R on the basis of the left and right one eye opening degrees $\alpha L$ and $\alpha R$ when the left and right one eye opening degrees $\alpha L$ and $\alpha R$ substantially match each other, and calculating the eye opening degree $\alpha$ on the basis of the selected one eye opening degree $\alpha$ when the left and right one eye opening degrees $\alpha L$ and $\alpha R$ do not substantially match each other; and Steps S90 to S110 of determining the propriety of the eye opening degree $\beta A$ calculated on the basis of the first image by comparing the eye opening degree $\beta A$ calculated on the basis of the first image with the eye opening degree $\beta B$ calculated on the basis of a second image prior to the first image.

Further, the eye opening degree detection program according to the first embodiment allows a computer to execute: Procedure S10 of storing images that include, at least, regions of both eyes of a target person and are obtained by being imaged while shifting time by the imaging devices 11 and 12; Procedures S20 to S30 of calculating each of the one eye opening degrees $\alpha L$ and $\alpha R$ of the left and right eyes of a first image; Procedures S40 to S70 of creating the pixel value histogram of each region of the left and right eyes when the left and right one eye opening degrees $\alpha L$ and $\alpha R$ do not substantially match each other, and selecting the correctly-calculated one eye opening degree $\alpha$ on the basis of the pixel value histogram; Procedures S70 and S80 of calculating the eye opening degree 1 on the basis of the left and right one eye opening degrees $\alpha L$ and $\alpha R$ when the left and right one eye opening degrees $\alpha L$ and $\alpha R$ substantially match each other, and calculating the eye opening degree $\beta$ on the basis of the selected one eye opening degree $\alpha$ when the left and right one eye opening degrees $\alpha L$ and $\alpha R$ do not substantially match each other; and Procedures S90 to S110 of determining the propriety of the eye opening degree $\beta A$ calculated on the basis of the first image by comparing eye opening degree $\beta A$ calculated on the basis of the first image with the eye opening degree $\beta B$ calculated on the basis of a second image prior to the first image.

Second Embodiment

The doze detection system 1 using the eye opening degree detection unit 20 has been described in the first embodiment. However, an automatic shutter system using the eye opening degree detection unit 20 will be described in a second embodiment.

First, a configuration of the automatic shutter system according to the second embodiment will be described.

Figure 9:
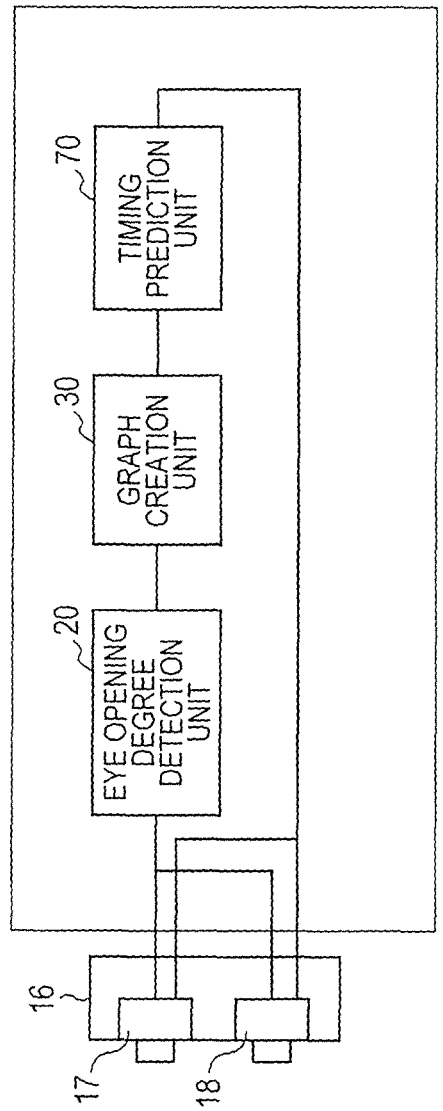
FIG. 9 is a diagram for showing an outline configuration of an automatic shutter system 2 according to a second embodiment.

FIG. 9 is a diagram for showing an outline configuration of an automatic shutter system 2 according to the second embodiment. The automatic shutter system 2 includes a camera 16, an eye opening degree detection unit 20, a graph creation unit 30, a timing prediction unit 70, and the like.

The automatic shutter system 2 configures, for example, a compound eye digital camera system in which two cameras are mounted.

The eye opening degree detection unit 20 and the graph creation unit 30 may be the same as those according to the first embodiment. The explanations of the configurations and operations thereof will be omitted.

The camera 16 includes two imaging units 17 and 18. The imaging units 17 and 18 alternately image a target person, and outputs the images to the eye opening degree detection unit 20. Blinking can be stably imaged in some cases by the system in which the two imaging units 17 and 18 are provided in one camera 16 as compared to a system in which one imaging unit is provided in each of two cameras.

The timing prediction unit 70 calculates an average eye opening period of time among a plurality of blinks in the past on the basis of the eye opening degree transition graph created and output by the graph creation unit 30, predicts the start time of the next blink, and determines the shutter time excluding the eye closing period of time. Then, the camera 16 automatically releases the shutter on the basis of the shutter time to image a target person.

Next, an operation of the automatic shutter system 2 according to the second embodiment, namely, an automatic shutter method will be concretely described.

FIG. 10 is a flowchart for showing a processing procedure of the automatic shutter method according to the second embodiment.

When an operation of the automatic shutter system 2 is started, the imaging units 17 and 18 alternately image a target person, and the eye opening degree detection unit 20 detects the eye opening degree R. In addition, the graph creation unit 30 creates the eye opening degree transition graph (Step S210). Step S210 corresponds to Step S10 to Step S130 of the processing procedure in the doze detection method according to the first embodiment, and the detailed explanation thereof will be omitted (see FIG. 2).

FIG. 11 shows an example of the eye opening degree transition graph according to the second embodiment.

Next, the timing prediction unit 70 calculates an average value (hereinafter, referred to as an "average eye opening period of time) of the eye opening periods of time Na among blinks in the past (Step S220). In the example of the eye opening degree transition graph shown in FIG. 11, the timing prediction unit 70 calculates an average eye opening period of time TNa of five eye opening periods of time Na1 to Na5.

Next, the timing prediction unit 70 updates present time T (Step S230).

Next, the timing prediction unit 70 determines whether or not shutter time TS has been determined (Step S240).

When it is determined that the shutter time TS has not been determined (No in Step S240), the timing prediction unit 70 obtains the present eye opening degree $\beta A$ (Step S250).

Next, the timing prediction unit 70 determines whether or not the last and present eye opening degrees $\beta B$ and $\beta A$ are normal values and are larger than the eye opening threshold value Xth (Step S260).

When the timing prediction unit 70 determines that the last and present eye opening degrees $\beta B$ and $\beta A$ are not normal values or are not larger than the eye opening threshold value Xth (No in Step S260), the present image is determined as a blink state (Step S270), and the flow returns to Step S230.

On the other hand, when the timing prediction unit 70 determines that the last and present eye opening degrees $\beta B$ and $\beta A$ are normal values and are larger than the eye opening threshold value Xth (Yes in Step S260), the imaging timing of the present image is set to blink end time T (Step S280).

In addition, the timing prediction unit 70 adds the blink end time TA to the average eye opening period of time TNa to predict the next blink start time TB (TB=TA+TNa) (Step S290), and the shutter time TS (TB=TA+(TNa/2)) excluding the eye closing period of time is determined (Step S300). Then, the flow returns to Step S230.

Further, when the timing prediction unit 70 determines that the shutter time TS has been determined (Yes in Step S240), it is determined whether or not the present time T is the shutter time TS (Step S310).

When the timing prediction unit 70 determines that the present time T is not the shutter time TS (No in Step S310), the flow returns to Step S230.

On the other hand, when the timing prediction unit 70 determines that the present time T is the shutter time TS (Yes in Step S310), the camera 16 is instructed to release the shutter, and automatically images the target person (Step S320). Then, the process is completed.

As described above, the shutter can be automatically released while monitoring the blink state even in a bad light environment in the automatic shutter system 2 and the automatic shutter method according to the second embodiment.

It should be noted that two imaging units 17 and 18 of one camera 16 alternately image a target person, and the images are output to the eye opening degree detection unit 20 in the automatic shutter system 2 and the automatic shutter method according to the second embodiment. However, as similar to the first embodiment, two cameras 11 and 12 may be provided to alternately image a target person, and the images may be output to the eye opening degree detection unit 20.

As described above, the automatic shutter system according to the second embodiment includes the eye opening degree detection system, the graph creation unit 30 that creates the eye opening degree transition graph on the basis of the eye opening degrees $\beta A$ calculated by the eye opening degree determination unit 24, and the timing prediction unit 70 that calculates the average eye opening period of time TNa on the basis of the eye opening degree transition graph and determines the shutter time TS on the basis of the average eye opening period of time TNa and the eye opening degree $\beta A$ to allow the imaging devices 11 and 12 to image.

The invention achieved by the inventors has been described above in detail on the basis of the respective embodiments. However, it is obvious that the present invention is not limited to the above-described embodiments, but can be variously changed without departing from the scope of the invention.

What is claimed is:

1. An eye opening degree detection system comprising:
a plurality of imaging devices that generates images including, at least, regions of both eyes of a target person while shifting time;
a one eye opening degree calculation unit that calculates each one eye opening degree of the left and right eyes of a first image;
an eye opening degree selection unit that creates a pixel value histogram of each region of the left and right eyes when the left and right one eye opening degrees do not substantially match each other, and selects a correctly-calculated one eye opening degree on the basis of the pixel value histogram;
an eye opening degree calculation unit that calculates an eye opening degree on the basis of the left and right one eye opening degrees when the left and right one eye opening degrees substantially match each other, and calculates an eye opening degree on the basis of the one eye opening degree selected by the eye opening degree selection unit when the left and right one eye opening degrees do not substantially match each other; and an eye opening degree detection device having an eye opening degree determination unit that compares the eye opening degree calculated on the basis of the first image with an eye opening degree calculated on the basis of a second image prior to the first image to determine the propriety of the eye opening degree calculated on the basis of the first image.

2. The eye opening degree detection system according to claim 1, wherein the eye opening degree determination unit determines that the eye opening degree calculated on the basis of the first image is valid when a difference between the eye opening degree calculated on the basis of the first image and the eye opening degree calculated on the basis of the second image is equal to or smaller than a threshold value calculated on the basis of an imaging timing difference between the first image and the second image.

3. A doze detection system comprising:

the eye opening degree detection system according to claim 1;

a graph creation unit that creates an eye opening degree transition graph on the basis of an eye opening degree determined by an eye opening degree determination unit; and a doze detection unit that determines an eye opening period of time and an eye closing period of time on the basis of the eye opening degree transition graph, and detects dozing of the target person on the basis of a ratio of the eye opening period of time to the eye closing period of time in a predetermined period of time.

4. The doze detection system according to claim 3, wherein when the ratio is out of a range between a predetermined lower limit threshold value excluding 0 and a predetermined upper limit threshold value excluding infinity, the doze detection unit detects dozing of the target person.

5. An automatic shutter system comprising:

the eye opening degree detection system according to claim 1;

a graph creation unit that creates an eye opening degree transition graph on the basis of an eye opening degree determined by an eye opening degree determination unit, and a timing prediction unit that calculates an average eye opening period of time on the basis of the eye opening degree transition graph, and determines shutter time on the basis of the average eye opening period of time and the eye opening degree to allow the imaging devices to image.

6. An eye opening degree detection method comprising the steps of:

generating images including, at least, regions of both eyes of a target person while shifting time by a plurality of imaging devices;

calculating each one eye opening degree of the left and right eyes of a first image;

creating a pixel value histogram of each region of the left and right eyes when the left and right one eye opening degrees do not substantially match each other, and selecting a correctly-calculated one eye opening degree on the basis of the pixel value histogram;

calculating an eye opening degree on the basis of the left and right one eye opening degrees when the left and right one eye opening degrees substantially match each other, and calculating an eye opening degree on the basis of the selected one eye opening degree when the left and right one eye opening degrees do not substantially match each other, and determining the propriety of the eye opening degree calculated on the basis of the first image by comparing the eye opening degree calculated on the basis of the first image with an eye opening degree calculated on the basis of a second image prior to the first image.

7. An eye opening degree detection program allowing a computer to execute the procedures of:

storing a plurality of images that includes, at least, regions of both eyes of a target person and is obtained by being imaged while shifting time by a plurality of imaging devices;

calculating each one eye opening degree of the left and right eyes of a first image;

creating a pixel value histogram of each region of the left and right eyes when the left and right one eye opening degrees do not substantially match each other, and selecting a correctly-calculated one eye opening degree on the basis of the pixel value histogram;

calculating an eye opening degree on the basis of the left and right one eye opening degrees when the left and right one eye opening degrees substantially match each other, and calculating an eye opening degree on the basis of the selected one eye opening degree when the left and right one eye opening degrees do not substantially match each other, and determining the propriety of the eye opening degree calculated on the basis of the first image by comparing the eye opening degree calculated on the basis of the first image with an eye opening degree calculated on the basis of a second image prior to the first image.

* * * * *